(12) United States Patent
Harada et al.

(10) Patent No.: US 10,459,151 B2
(45) Date of Patent: Oct. 29, 2019

(54) OPTICAL SHEET FOR LIQUID CRYSTAL DISPLAY DEVICE, AND BACKLIGHT UNIT FOR LIQUID CRYSTAL DISPLAY DEVICE

(71) Applicant: KEIWA INC., Tokyo (JP)

(72) Inventors: Kenichi Harada, Tokyo (JP); Yoshitada Namikawa, Tokyo (JP); Tadayoshi Fukuda, Tokyo (JP); Yuki Matsuno, Tokyo (JP)

(73) Assignee: Keiwa Inc., Tokyo (JP)

( * ) Notice: Subject to any disclaimer, the term of this patent is extended or adjusted under 35 U.S.C. 154(b) by 0 days.

(21) Appl. No.: 15/856,224

(22) Filed: Dec. 28, 2017

(65) Prior Publication Data
US 2018/0180794 A1 Jun. 28, 2018

(30) Foreign Application Priority Data

Dec. 28, 2016 (JP) .................................. 2016-256644
Nov. 29, 2017 (JP) .................................. 2017-228621

(51) Int. Cl.
*F21V 8/00* (2006.01)
*G02B 5/02* (2006.01)

(52) U.S. Cl.
CPC ......... *G02B 6/0051* (2013.01); *G02B 5/0221* (2013.01); *G02B 5/0226* (2013.01); *G02B 5/0257* (2013.01); *G02B 5/0278* (2013.01); *G02B 6/0053* (2013.01)

(58) Field of Classification Search
CPC .. G02B 6/0051; G02B 6/0053; G02B 5/0221; G02B 5/0226; G02B 5/0257; G02B 5/0278

USPC ......................................................... 362/607
See application file for complete search history.

(56) References Cited

U.S. PATENT DOCUMENTS

| 2008/0303777 | A1 | 12/2008 | Inoue et al. |
| 2010/0079701 | A1* | 4/2010 | Murayama ........... G02B 5/0226 349/64 |
| 2010/0238685 | A1* | 9/2010 | Huang ................. G02B 5/1814 362/607 |
| 2011/0026124 | A1 | 2/2011 | Kim et al. |

(Continued)

FOREIGN PATENT DOCUMENTS

| JP | 2005-077448 A | 3/2005 |
| JP | 2011-013430 A | 1/2011 |
| KR | 20120039405 A | 4/2012 |

(Continued)

*Primary Examiner* — Anh T Mai
*Assistant Examiner* — Jessica M Apenteng
(74) *Attorney, Agent, or Firm* — Norris McLaughlin, P.A.

(57) ABSTRACT

An optical sheet for a liquid crystal display device has functions of condensing rays of light with respect to a specific direction in a plane of the optical sheet, and diffusing rays of light with respect to a direction perpendicular to the specific direction. A backlight unit for a liquid crystal display device includes: a light guide film for guiding rays of light incident on an end face of the light guide film toward a front face side; at least one LED light source disposed along the end face of the light guide film; the optical sheet disposed on the front face side; and a prism sheet disposed on a front face of the optical sheet, with the specific direction being parallel to a direction of rays of light emitted by the at least one LED light source and perpendicular to a direction of prism rows of the prism sheet.

5 Claims, 21 Drawing Sheets

(56) References Cited

U.S. PATENT DOCUMENTS

2012/0020081 A1\* 1/2012 Goto .................. G02B 3/005
  362/235
2012/0069599 A1\* 3/2012 Cornelissen ........... G09F 13/18
  362/613

FOREIGN PATENT DOCUMENTS

| TW | 201248211 A | 12/2012 |
|----|-------------|---------|
| TW | 201326912 A | 7/2013  |

\* cited by examiner

OPTICAL SHEET FOR LIQUID CRYSTAL DISPLAY DEVICE, AND BACKLIGHT UNIT FOR LIQUID CRYSTAL DISPLAY DEVICE

BACKGROUND OF THE INVENTION

Field of Invention

The present invention relates to an optical sheet for a liquid crystal display device, and a backlight unit for the liquid crystal display device.

Description of the Related Art

Backlight systems, which illuminate a liquid crystal layer from behind, are in widespread use as a transmissive liquid crystal display device, and the transmissive liquid crystal display device is equipped with an edge-lit (side-lit) backlight unit, a direct-lit backlight unit or the like on the back face side of the liquid crystal layer. As shown in FIG. 21, such an edge-lit backlight unit 101 is generally equipped with LED light sources 102, a light-guiding sheet 103 in the form of a rectangular plate disposed with an end face thereof being aligned with the LED light sources 102, and optical sheets 104 superimposed on the front face side of the light-guiding sheet 103. The optical sheets 104 have optical functions of, for example, diffusing and refracting the transmitted rays of light, and sheets used as the optical sheets 104 include a light diffusion sheet 105 which is disposed on the front face side of the light-guiding sheet 103 and primarily has a function of diffusing rays of light, a prism sheet 106 which is disposed on the front face side of the light diffusion sheet 105 and has a function refracting rays of light toward a normal direction, and the like (see, Japanese Unexamined Patent Application, Publication No. 2005-77448).

With regard to the functions of the backlight unit 101, in brief; first, rays of light having been emitted by the LED light sources 102 and entering the optical waveguide sheet 103 are reflected on reflection dots or a reflection sheet (not shown in FIG. 21) on the back face of the light-guiding sheet 103 as well as on each lateral face, and exit from the front face of the light-guiding sheet 103. The rays of light having exited from the front face of the light-guiding 103 enter the light diffusion sheet 105, are diffused and exit from its front face. The rays of light having exited from the front face of the light-diffusion sheet 105 enter the prism sheet 106, refracted by protruding-streak prism portions formed on the front face of the prism sheet 106 toward the normal direction and emitted, whereby the entire liquid crystal layer on the front face side (not shown in FIG. 21) is illuminated with the rays of light. Although not shown in FIG. 21, sheets which may be used as the optical sheets 104 include: an upper-layer diffusion sheet which is disposed on the front face side of the prism sheet 106 and slightly diffuses the rays of light to inhibit the lack in uniformity of luminance caused by, for example, the shapes of protruding prism portions of the prism sheet 106; a micro lens sheet which has a refraction function toward the normal direction and a wide-angle light diffusion function; and the like.

In the backlight unit 101, the LED light sources 102 are disposed along one end face of the light-guiding sheet 103, and thus, the rays of light exiting from the front face of the LED light sources 103 have such a directivity that a large amount of the rays of light are inclined toward the light emission direction of the LED light sources 102. The backlight unit 101 improves the luminance in the front direction in such a manner that the rays of light having such a directivity are diffused by the light diffusion sheet 105, and directed upward by the prism sheet 106 to travel in the normal direction.

PRIOR ART DOCUMENTS

Patent Documents

Patent Document 1: Japanese Unexamined Patent Application, Publication No. 2005-77448

SUMMARY OF THE INVENTION

From a study, the present inventors found that the edge-lit backlight unit 101 including the LED light sources 102 fails to produce a sufficient improvement of the face luminance. Although the reason for the insufficient improvement is not necessarily clarified, it is presumed that the directions of the rays of light exiting from the light diffusion sheet 105 are unevenly distributed, and the uneven distribution is not in agreement with the optical characteristic of the prism sheet 106, allowing only a small proportion of the rays of light to be directed upward by the prism sheet 106 to travel in the normal direction.

The present invention has been made in view of such circumstances, and an object of the present invention is to provide: an optical sheet which is for use in a liquid crystal display and enables a backlight unit including a prism sheet to produce a sufficient improvement of face luminance; and a backlight unit which is for use in the liquid crystal display and includes the optical sheet.

The optical sheet for a liquid crystal display device according to an aspect of the present invention made for solving the aforementioned problems (hereinafter, also merely referred to as "optical sheet") has specific optical functions on transmitted rays of light. The optical functions include a function of condensing rays of light with respect to a specific direction in a plane of the optical sheet, and a function of diffusing rays of light with respect to a direction perpendicular to the specific direction.

The backlight unit including a prism sheet disposed in such a manner that the direction of prism rows of the prism sheet is perpendicular to the direction of rays of light emitted by the LED light sources is enabled to produce a sufficient improvement of face luminance, when the optical sheet is disposed on the back face side of the prism sheet in such a manner that the specific direction is perpendicular to the direction of the prism rows. Although the reason for the sufficient improvement is not necessarily clarified, it is presumed that rays of light having been emitted by the LED light sources and entering the optical sheet are condensed in the specific direction and diffused in the direction perpendicular to the specific direction, whereby a relatively high proportion of the rays of light having exited from the optical sheet and entering the prism sheet is directed upward at a desired angle by the prism rows.

The optical sheet preferably has a multi-streak diffraction grating pattern oriented in the specific direction. Due to having the multi-streak diffraction grating pattern oriented in the specific direction, the optical sheet is capable of diffusing rays of light in the width direction of the diffraction grating pattern, and is thus capable of performing, readily and reliably, the function of condensing rays of light with respect to the specific direction and the function of diffusing rays of light with respect to the direction perpendicular to the specific direction.

The diffraction grating pattern preferably includes scratches or hairline stripes extending in the specific direction. Due to the diffraction grating pattern including scratches or hairline stripes extending in the specific direction, rays of light are readily and reliably diffused in the width direction of the diffraction grating pattern.

The optical sheet is preferably a light diffusion sheet including a substrate layer and a light diffusion layer overlaid on one face side of the substrate layer. Due to the optical sheet for a liquid crystal display device being the light diffusion layer including the substrate layer and the light diffusion layer overlaid on the one face side of the substrate layer, the optical sheet is apt to perform the enhanced function of condensing rays of light with respect to the specific direction and the enhanced function of diffusing rays of light with respect to the direction perpendicular to the specific direction.

The light diffusion layer preferably contains beads and a binder for the beads. Due to the beads and the binder for the beads being contained in the light diffusion layer, the optical sheet is able to perform the more adequately enhanced function of condensing rays of light with respect to the specific direction and the more adequately enhanced function of diffusing rays of light with respect to the direction perpendicular to the specific direction.

The haze value of the optical sheet is preferably no less than 60% and no greater than 95%. Due to the haze value falling within the above range, the optical sheet is apt to perform the further enhanced function of condensing rays of light with respect to the specific direction and the further enhanced function of diffusing rays of light with respect to the direction perpendicular to the specific direction.

A backlight unit for a liquid crystal display device according to another aspect of the present invention made for solving the aforementioned problems (hereinafter, also merely referred to as "backlight unit") includes: a light guide film for guiding rays of light incident on an end face of the light guide film toward a front face side of the light guide film; at least one LED light source disposed along the end face of the light guide film; the optical sheet disposed on the front face side of the light guide film; and a prism sheet disposed on the front face side of the optical sheet. The specific direction in the optical sheet is parallel to a direction of rays of light emitted by the at least one LED light source and is perpendicular to a direction of prism rows of the prism sheet.

The specific direction in the optical sheet is parallel to the direction of rays of light emitted by the LED light sources, and is perpendicular to the direction of the prism rows of the prism sheet, whereby the rays of light transmitted through the optical sheet are condensed in the direction perpendicular to the direction of the prism rows of the prism sheet and are diffused in the direction of the prism rows. Consequently, the backlight unit is enabled to produce a sufficient enhancement of face luminance.

It is to be noted that the term "front face side" as referred to herein means a viewer's side of a liquid crystal display device, and the term "back face side" as referred to herein means the opposite side thereof. The term "diffraction grating pattern" as referred to is not limited to the shape having undergone the strict adjustment of optical characteristics, and broadly encompasses shapes which cause diffraction of incident rays of light. The term "scratches or hairline stripes extending in a direction" as referred to herein means geometries formed by long and narrow flaws oriented in the direction. The "haze value" as referred to means a value determined in accordance with JIS-K-7136: 2000.

As described in the foregoing, the optical sheet for a liquid crystal display device according to the aspect of the present invention enables the backlight unit to produce a sufficient improvement of face luminance. The backlight unit for a liquid crystal display device according to the another aspect of the present invention is enabled to produce a sufficient improvement of face luminance.

DESCRIPTION OF EMBODIMENTS

Hereinafter, embodiments of the present invention will be described in detail with appropriate references to the drawings.

First Embodiment
Backlight Unit

Figure 1:
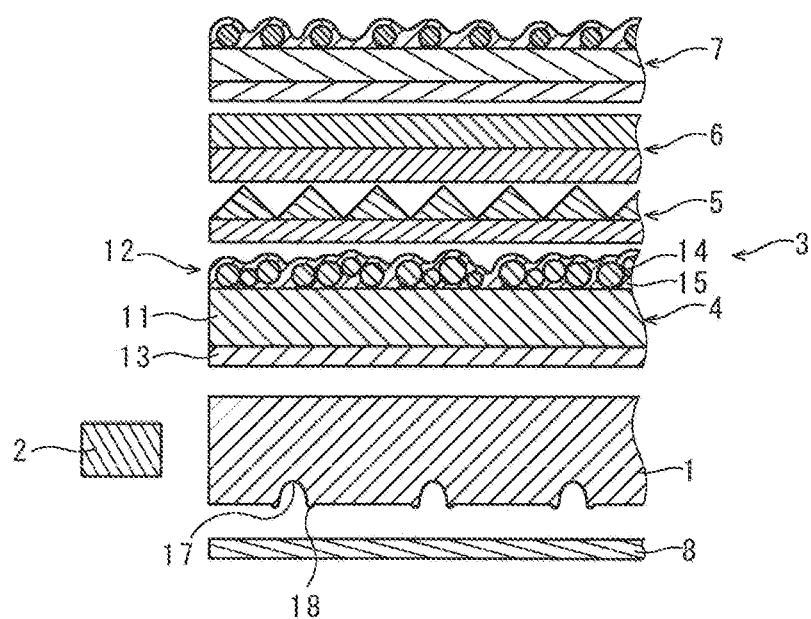
FIG. 1 is a schematic end view of a backlight unit for a liquid crystal display device according to a first embodiment of the present invention.

A backlight unit for a liquid crystal display device (hereinafter, merely referred to as "backlight unit") shown in FIG. 1 is an edge-lit backlight unit and includes LED light sources. The backlight unit includes: a light guide film 1 for guiding rays of light incident on an end face of the light guide film 1 toward the front face side of the light guide film 1; LED light sources 2 disposed along the end face of the light guide film 1; and optical sheets 3 superimposed on the front face side of the light guide film 1. Sheets provided as the optical sheets 3 include: a light diffusion sheet (an underlayer light diffusion sheet 4) according to an embodiment of the present invention disposed on the front face side of the light guide film 1; a first prism sheet 5 disposed on the front face side of the underlayer light diffusion sheet 4; a second prism sheet 6 disposed on the front face side of the first prism sheet 5; and a light diffusion sheet (an upper-layer light diffusion sheet 7) disposed on the front face side of the second prism sheet 6. The backlight unit further includes a reflection sheet 8 disposed on the back face side of the light guide film 1. The underlayer light diffusion sheet 4 diffuses rays of light incident from the back face side and condenses the rays of light toward the normal direction (condensing and diffusion of light). The first prism sheets 5 and the second prism sheet 6 refract rays of light incident from the back face side toward the normal direction. Specifically, the direction of prism rows (the ridge line direction of protruding-streak prism portions) of the first prism sheet 5 and the direction of prism rows (the ridge line direction of protruding-streak prism portions) of the second prism sheet 6 are orthogonal to each other, so that the first prism sheet 5 refracts rays of light incident from the underlayer light diffusion sheet 4 in the direction perpendicular to the direction of the prism rows and toward the normal direction, and the second prism sheet 6 refracts rays of light exiting from the first prism sheet 5 so as to allow the rays of light to travel in the direction substantially perpendicular to the back face of a liquid crystal display element. The upper-layer diffusion sheet 7 slightly diffuses rays of light incident from its back face side to inhibit the lack in uniformity of luminance caused by, for example, the shapes of the prism rows of the first prism sheet 5 and the second prism sheet 6. The reflection sheet 8 reflects the rays of light exiting from the back face side of the light guide film 1 toward the front face side, and allows the rays of light to enter again the light guide film 1.

Underlayer Light Diffusion Sheet

Figure 2:
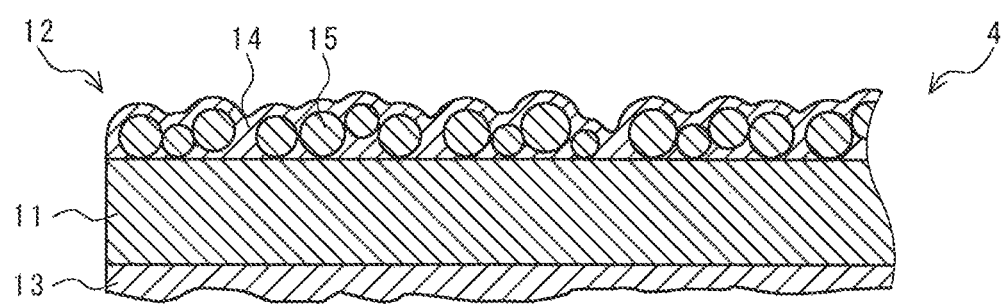
FIG. 2 is a schematic enlarged end view of a light diffusion sheet of the backlight unit shown in FIG. 1.

As shown in FIG. 2, the underlayer light diffusion sheet 4 includes: a substrate layer 11; a light diffusion layer 12 overlaid on one face side of the substrate layer 11; and a back layer 13 overlaid on a back face side of the substrate layer 11. The underlayer light diffusion sheet 4 is formed into a substantially rectangular shape in a planar view. The underlayer light diffusion sheet 4 is composed of the substrate layer 11, the light diffusion layer 12 and the back layer 13, i.e., the underlayer light diffusion sheet 4 does not include layers other than the substrate layer 11, the light diffusion layer 12 and the back layer 13.

A specific direction in a plane of the underlayer light diffusion sheet 4 is parallel to the direction of rays of light emitted by the LED light sources 2 (light emission direction). The specific direction in the underlayer light diffusion sheet 4 is perpendicular to the direction of the prism rows of the first prism sheet 5 which is disposed directly on the front face side of the underlayer light diffusion sheet 4 (without any other optical sheets between the underlayer light diffusion sheet 4 and the first prism sheet 5). The underlayer light diffusion sheet 4 is an optical sheet which is for use in a liquid crystal display device and has specific optical functions on transmitted rays of light (rays of light having been incident from the back face side and exiting from the front face side). The optical functions include a function of condensing rays of light with respect to the specific direction in the plane (the direction of rays of light emitted by the LED light sources 2), and a function of diffusing rays of light with respect to the direction perpendicular to the specific direction (the direction of the prism rows of the first prism sheet 5). Thus, the underlayer light diffusion sheet 4 is anisotropic in terms of the light diffusion function, which is higher in the direction perpendicular to the specific direction in the plane than in the specific direction.

Substrate Layer

Due to the need of transmitting rays of light, the substrate layer 11 is formed to be transparent. The substrate layer 11 contains a synthetic resin as a principal component. The principal component of the substrate layer 11 is not particularly limited, and examples thereof include polyethylene terephthalate, polyethylene naphthalate, acrylic resins, polycarbonates, polystyrenes, polyolefins, cellulose acetate, weather resistant vinyl chlorides, and the like. Among these, polyethylene terephthalate having excellent transparency and high strength are preferred, and polyethylene terephthalate with improved deflection performance is particularly preferred. It is to be noted that the term "principal component" as referred to herein means a component contained in the highest proportion, and refers to a component present in a proportion of no less than 50% by mass.

Light Diffusion Layer

The light diffusion layer 12 is overlaid on the front surface side of the substrate layer 11. The light diffusion layer 12 constitutes the frontmost face of the underlayer light diffusion sheet 4. The light diffusion layer 12 contains beads 14 and a binder 15 for the beads 14. The beads 14 are surrounded by the binder 15. The light diffusion layer 12 in which the beads 14 are contained in a dispersion state is capable of diffusing, substantially uniformly, rays of light transmitted from the back face side to the front face side. In addition, due to the beads 14, ultrafine projections and recesses are formed substantially uniformly on the front face of the light diffusion layer 12, and the individual protruding portions and the individual recessed portions of the ultrafine projections and recesses are lens-shaped. The light diffusion layer 12 performs, owing to a lens-like effect of the ultrafine projections and recesses, a superior light diffusion function, and thus has, owing to its light diffusion function, both a function of refracting transmitted rays of light toward the normal direction and a function of condensing the transmitted rays of light macroscopically into the normal direction.

The beads 14 are resin particles having a property of diffusing rays of light. Examples of the principal component of the beads 14 include acrylic resins, acrylonitrile resins, polyurethane, polyvinyl chloride, polystyrene, polyamide, polyacrylonitrile, and the like. Of these, highly transparent acrylic resins are preferred, and polymethyl methacrylate (PMMA) is particularly preferred.

The shape of the beads 14 is not particularly limited, and may be for example, spherical, cubic, needle-like, rod-like, spindle-like, plate-like, scale-like, fiber-like, etc. In particular, spherical beads are preferred in light of superior light diffusibility.

The binder 15 is prepared by curing (through crosslinking, etc.) a polymer composition containing a base polymer. The binder 15 allows the beads 14 to be arranged and fixed with a substantially uniform density on the entire front face of the substrate layer 11. It is to be noted that, for example, a fine inorganic filler, a curing agent, a plasticizer, a dispersant, various types of levelling agents, an antistatic agent, an ultraviolet ray-absorbing agent, an anti-oxidizing agent, a viscosity modifier, a lubricant, a light stabilizer, and the like may be further blended in the polymer composition for forming the binder 15, as needed.

Back Layer

The back layer 13 constitutes the rearmost face of the underlayer light diffusion sheet 4. Due to the need of transmit rays of light, the back layer 13 is formed to be transparent. The back layer 13 is formed from a synthetic resin as a principal component. The principal component of the back layer 13 is not particularly limited, and may be exemplified by a thermosetting resin, an active energy ray-curable resin, and the like.

Examples of the thermosetting resin include an epoxy resin, a silicone resin, a phenol resin, a urea resin, an unsaturated polyester resin, a melamine resin, an alkyd resin, an acrylic resin, an amide-functional copolymer, a urethane resin, and the like.

Examples of the active energy ray-curable resin include ultraviolet my-curable resins that are crosslinked and cured upon irradiation with an ultraviolet ray, electron beam-curable resins that are crosslinked and cured upon irradiation with an electron beam, and the like. In addition, the active energy ray-curable resin may be appropriately selected for use from among polymerizable monomers and polymerizable oligomers. Of these, acrylic ultraviolet ray-curable resins, urethane ultraviolet ray-curable resins or acrylic urethane ultraviolet ray-curable resins are preferred as the active energy ray-curable resin.

The underlayer light diffusion sheet 4 has, on the back face of the back layer 13 (the back face of the underlayer light diffusion sheet), a multi-streak diffraction grating pattern 16 oriented in the specific direction. The diffraction grating pattern 16 includes multiple projection-recess patterned streaks extending in the specific direction. Due to the underlayer light diffusion sheet 4 having the diffraction grating pattern 16, the rays of light incident on the diffraction grating pattern 16 are diffused in the width direction of the diffraction grating pattern 16 (the direction perpendicular to the average orientation of the multiple projection-recess patterned streaks). The underlayer light diffusion sheet 4 accordingly has the function of condensing rays of light with respect to the specific direction and the function of diffusing rays of light with respect to the direction perpendicular to the specific direction. The diffraction grating pattern 16 preferably includes scratches or hairline stripes extending in the specific direction. Due to the diffraction grating pattern 16 including scratches or hairline stripes extending in the specific direction, the underlayer light diffusion sheet 4 is capable of diffusing rays of light readily and reliably in the width direction of the diffraction grating pattern 16. The term "average orientation of the multiple projection-recess patterned streaks" as referred to herein means the average orientation of recessed portions constituting the multiple projection-recess patterned streaks.

Figure 3:
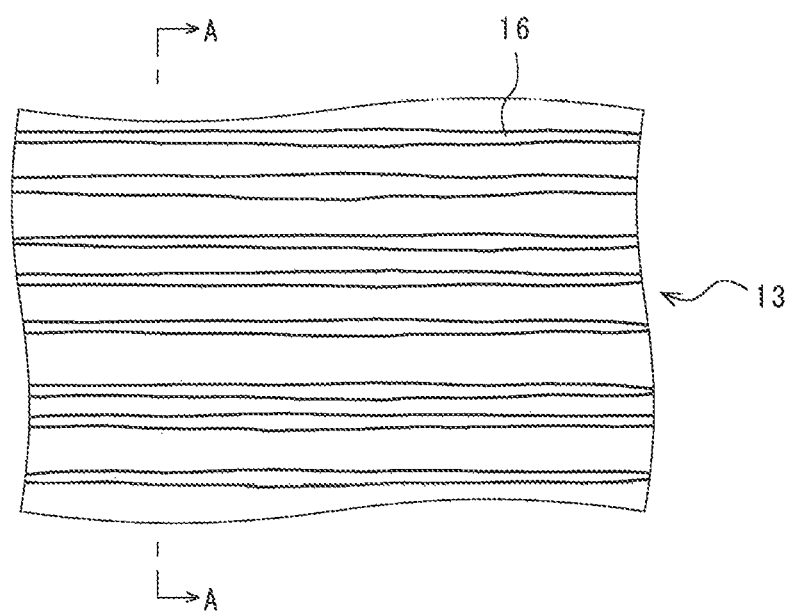
FIG. 3 is a schematic rear view of a light diffusion sheet shown in FIG. 2.
Figure 4:
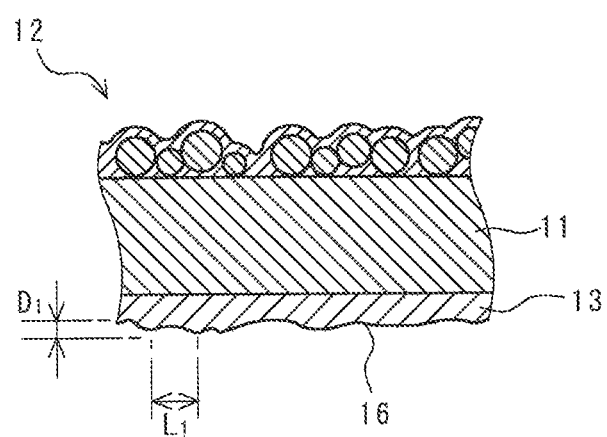
FIG. 4 is a partial end view taken along a line A-A of the light diffusion sheet shown in FIG. 3.

The diffraction grating pattern 16 is formed substantially evenly (with a substantially uniform density) on the entire back face of the back layer 13. As shown in FIGS. 3 and 4, the multiple projection-recess patterned streaks constituting the diffraction grating pattern 16 extend in such a manner that the longitudinal direction of the multiple streaks is aligned with the direction of rays of light emitted by the LED light sources 2, i.e., the multiple projection-recess patterned streaks are oriented in the direction of rays of light emitted by the LED light sources 2. The upper limit of the angle of inclination formed by each of the projection-recess patterned streaks with the direction of rays of light is preferably ±30°, more preferably ±15°, and still more preferably ±5°. The projection-recess patterned streaks may be irregular in orientation as long as the angle of inclination falls within the above range, i.e., the orientations of the individual projection-recess patterned streaks do not need to be in perfect agreement with each other. Due to the projection-recess patterned streaks being irregular in orientation, generation of rainbow unevenness in the liquid crystal display device caused by the multiple projection-recess patterned streaks can be inhibited. Although the recessed portions of the multiple projection-recess patterned streaks are preferably discrete in light of better control of the direction in which rays of light are diffused, the recessed portions in places may intersect each other.

Each of the recessed portions of the multiple projection-recess patterned streaks may extend, in the longitudinal direction thereof, continuously between both ends of the back layer 13, and the ratio of the average length multiple projection-recess patterned streaks to the average width of the recessed portions of the multiple projection-recess patterned streaks is preferably no greater than 10,000, and more preferably no greater than 5,000. The lower limit of the ratio of the average length multiple projection-recess patterned streaks to the average width of the recessed portions of the multiple projection-recess patterned streaks is preferably no less than 2, and more preferably no less than 3. When the ratio of the average length to the average width of the multiple projection-recess patterned streaks is greater than the upper limit, it may be difficult to provide, in order to inhibit generation of rainbow unevenness in the liquid crystal display device, multiple projection-recess patterned streaks which are densely formed and irregular in orientation. To the contrary, when the ratio of the average length to the average width of the multiple projection-recess patterned streaks is less than the lower limit, the amount of rays of light diffused in the width direction of the diffraction grating pattern 16 may not be increased sufficiently, relative to the amount of rays of light incident on the diffraction grating pattern 16. It is to be noted that the term "average length of the recessed portions of the multiple projection-recess patterned streaks" as referred to herein means a value obtained by averaging the lengths of randomly chosen 20 recessed portions.

The recessed portions of the multiple projection-recess patterned streaks are preferably irregular in length. Due to the recessed portions of the multiple projection-recess patterned streaks being irregular in length, the underlayer light diffusion sheet 4 is enabled to inhibit generation of rainbow unevenness in the liquid crystal display device which is caused by the multiple projection-recess patterned streaks.

It is preferred that a width $L_1$, which is the width of each recessed portion of the multiple projection-recess patterned streaks, is not constant. As shown in FIG. 3, it is preferred that for each recessed portion of the projection-recess patterned streaks, the width $L_1$ varies randomly along the longitudinal direction of the recessed portion of the projection-recess patterned streaks. Due to the width $L_1$, which is the width of each recessed portion of the multiple projection recess patterned streaks, being not constant, the underlayer light diffusion sheet 4 is enabled to inhibit generation of rainbow unevenness in the liquid crystal display device which is caused by the multiple projection-recess patterned streaks.

The lower limit of the average width of the recessed portions of the multiple projection-recess patterned streaks is preferably 10 nm, more preferably 50 nm, and still more preferably 100 nm. On the other hand, the upper limit of the average width of the recessed portions of the multiple projection-recess patterned streaks is preferably 30 µm, more preferably 20 µm, and still more preferably 10 µm. When the average width of the recessed portions of the multiple projection-recess patterned streaks is less than the lower limit, formability of the diffraction grating pattern 16 may deteriorate. To the contrary, when the average width of the recessed portions of the multiple projection-recess patterned streaks is greater than the upper limit, diffusion of a sufficient amount of rays of light in the width direction of the diffraction grating pattern 16 may not be ensured. The width of each recessed portion of the projection-recess patterned streaks preferably varies randomly along the longitudinal direction within the above range. Due to the width of each recessed portion of the projection-recess patterned streaks varying randomly within the above range, the occurrence of moire caused by interference with other members (e.g., prism sheets and liquid crystal cells) having a cyclic pitch is prevented, and the regular occurrence of color separation is prevented, leading to prevention of rainbow unevenness and the like. It is to be noted that the term "average width of the recessed portions of the multiple projection-recess patterned streaks" as referred to herein means a value obtained by averaging the widths of randomly chosen 20 recessed portions measured at randomly chosen points, except for the both ends in the longitudinal direction of each recessed portion, on average level of the tips of the corresponding projecting portions of the multiple projection-recess patterned streaks.

The multiple projection-recess patterned streaks are preferably arranged at irregular pitches. Due to the multiple projection-recess patterned streaks being arranged at irregular pitches, the underlayer light diffusion sheet 4 is enabled to inhibit generation of rainbow unevenness in the liquid crystal display device which is caused by the multiple projection-recess patterned streaks. It is to be noted that the term "average pitch of the multiple projection-recess patterned streaks" as referred to herein means a value obtained by averaging pitches between 20 projection-recess patterned streaks adjacent to each other on a straight line perpendicular to the average orientation of the multiple projection-recess patterned streaks.

The lower limit of the average pitch of the multiple projection-recess patterned streaks is preferably 10 nm, more preferably 50 nm, and still more preferably 100 nm. The upper limit of the average pitch of the multiple projection-recess patterned streaks is preferably 10 µm, more preferably 9 µm, and still more preferably 7 µm. When the average pitch of the recessed portions of the multiple projection-recess patterned streaks is less than the lower limit, formability of the diffraction grating pattern 16 may deteriorate. To the contrary, when the average pitch of the recessed portions of the multiple projection-recess patterned streaks is greater than the upper limit, the amount of rays of light diffused in the width direction of the diffraction grating pattern 16 may not be increased sufficiently.

The upper limit of the standard deviation of the pitches of the multiple projection-recess patterned streaks is preferably 10 µm, more preferably 9 µm, and still more preferably 7 µm. When the standard deviation of the pitches of the multiple projection-recess patterned streaks is greater than the upper limit, the multiple projection-recess patterned streaks are arranged at excessively uneven pitches, whereby the amount of rays of light diffused in the width direction of the diffraction grating pattern 16 may not be increased uniformly over the entire region in which the multiple projection-recess patterned streaks are formed. Meanwhile, the lower limit of the standard deviation of the pitches of the multiple projection-recess patterned streaks may be, for example, 4 µm in light of ease in providing the multiple projection-recess patterned streaks in relatively random orientations. It is to be noted that the term "standard deviation of the pitches of the multiple projection-recess patterned streaks" as referred to herein means the standard deviation of the pitches of the multiple projection-recess patterned streaks measured at randomly chosen 20 points.

The lower limit of the average number of recessed portions of the multiple projection-recess patterned streaks per unit length (mm) in the direction perpendicular to the average orientation of the multiple projection-recess patterned streaks is preferably 10, more preferably 50, and still more preferably 100. On the other hand, the upper limit of the average number of recessed portions per unit length (mm) is preferably 10,000, more preferably 5,000, and still more preferably 1,000. When the average number of recessed portions is less than the lower limit, the amount of rays of light diffused in the width direction of the diffraction grating pattern 16 may not be increased sufficiently, relative to the amount of rays of light incident on the diffraction grating pattern 16. To the contrary, when the weight average number of recessed portions is greater than the upper limit, the formability of the diffraction grating pattern 16 may deteriorate.

The lower limit of an average depth $D_1$ of the recessed portions of the multiple projection-recess patterned streaks is preferably 10 nm, more preferably 500 nm, still more preferably 1 µm, and particularly preferably 2 µm. The upper limit of the average depth $D_1$ is preferably 10 µm, more preferably 5 µm, and still more preferably 3 µm. When the average depth $D_1$ is less than the lower limit, the amount of rays of light diffused in the width direction of the diffraction grating pattern 16 may not be increased sufficiently. To the contrary, when the average depth $D_1$ is greater than the upper limit, the back layer 13 may decrease in strength. It is to be noted that the term "average depth of each recessed portion of the multiple projection-recess patterned streaks" as referred to herein means a value obtained by measuring, at randomly chosen 20 points, the depths of recessed portions from the tip of the projecting portion on average level of the multiple projection-recess patterned streaks and averaging the depths thus measured.

The upper limit of the standard deviation of the depths of the recessed portions of the multiple projection-recess patterned streaks is preferably 4 µm, more preferably 3 µm, and still more preferably 2.5 µm. When the standard deviation of the depths is greater than the upper limit, the depths of the recessed portions of the multiple projection-recess patterned streaks are excessively uneven, whereby the amount of rays of light diffused in the width direction of the diffraction grating pattern 16 may not be increased uniformly over the entire region in which the diffraction grating pattern 16 is formed. On the other hand, the lower limit of the standard deviation of the depths is not particularly limited, and may be, for example, 0.3 µm. It is to be noted that the term "standard deviation of the depths of the multiple projection-recess patterned streaks" as referred to herein means the standard deviation of the depths of recessed portions of the projection-recess patterned streaks measured at randomly chosen 20 points.

The upper limit of the arithmetic average roughness (Ra) of the external face (the back face of the back layer 13) on which the diffraction grating pattern 16 is formed, with respect to the direction parallel to the orientation of the multiple projection-recess patterned streaks is preferably 1.5 µm, more preferably 1.2 µm, and still more preferably 1 µm.

When the arithmetic average roughness (Ra) is greater than the upper limit, the function of condensing rays of light with respect to the specific direction may be insufficient. On the other hand, the lower limit of the arithmetic average roughness (Ra) of the external face (the back face of the back layer 13) on which the diffraction grating pattern 16 is formed, with respect to the direction parallel to the orientation of the multiple projection-recess patterned streaks may be, for example, 0.005 μm. The term "arithmetic average roughness (Ra)" as referred to herein means a value determined in accordance with JIS-B0601: 1994, with a cut-off λc of 0.8 mm and an evaluation length of 4 mm.

The lower limit of the arithmetic average roughness (Ra) of the external face (the back face of the back layer 13) on which the diffraction grating pattern 16 is formed, with respect to the direction perpendicular to the orientation of the multiple projection-recess patterned streaks is preferably 0.01 μm, more preferably 0.1 μm, and still more preferably 0.5 μm. On the other hand, the upper limit of the arithmetic average roughness (Ra) of the external face (the back face of the back layer 13) on which the diffraction grating pattern 16 is formed, with respect to the direction perpendicular to the orientation of the multiple projection-recess patterned streaks is preferably 5 μm, more preferably 3 μm, and still more preferably 1.5 μm. When the arithmetic average roughness (Ra) is less than the lower limit, the function of diffusing rays of light with respect to the direction perpendicular to the specific direction may be insufficient. To the contrary, when the arithmetic average roughness (Ra) is greater than the upper limit, it may be difficult to regulate the angles at which rays of light are emitted.

It is preferred that the arithmetic average roughness (Ra) of the external face (the back face of the back layer 13) on which the diffraction grating pattern 16 is formed, with respect to the direction parallel to the orientation of the multiple projection-recess patterned streaks, and the arithmetic average roughness (Ra) thereof with respect to the direction perpendicular to the orientation of the orientation of the multiple projection-recess patterned streaks fall within the respective ranges mentioned above. Due to the arithmetic average roughness (Ra) with respect to the direction parallel to the orientation of the multiple projection-recess patterned streaks, and the arithmetic average roughness (Ra) with respect to the direction perpendicular to the orientation of the multiple projection-recess patterned streaks falling within the respective ranges mentioned above, the underlayer light diffusion sheet 4 is apt to perform both the enhanced function of condensing rays of light with respect to the specific direction and the enhanced function of diffusing rays of light with respect to the direction perpendicular to the specific direction.

The lower limit of the difference between the arithmetic average roughness (Ra) of the external face (the back face of the back layer 13) on which the diffraction grating pattern 16 is formed, with respect to the direction perpendicular to the orientation of the multiple projection-recess patterned streaks, and the arithmetic average roughness (Ra) thereof with respect to the direction parallel to the orientation of the multiple projection-recess patterned streaks is preferably 0.5 μm, more preferably 0.7 μm, and still more preferably 1 μm. Due to the difference in the arithmetic average roughness (Ra) being no less than the lower limit, both the function of condensing rays of light with respect to the specific direction and the function of diffusing rays of light with respect to the direction perpendicular to the specific direction are readily enhanced. On the other hand, the upper limit of the difference in the arithmetic average roughness (Ra) may be, for example, 1.9 μm.

The upper limit of the maximum height of profile (Ry) of the external face (the back face of the back layer 13) on which the diffraction grating pattern 16 is formed, with respect to the direction parallel to the orientation of the multiple projection-recess patterned streaks is preferably 3 μm, more preferably 2.5 μm, and still more preferably 2 μm. When the maximum height of profile (Ry) is greater than the upper limit, the function of condensing rays of light with respect to the specific direction may be insufficient. On the other hand, the lower limit of the maximum height of profile (Ry) of the external face (the back face of the back layer 13) on which the diffraction grating pattern 16 is formed, with respect to the direction parallel to the orientation of the multiple projection-recess patterned streaks may be, for example, 0.1 μm. The term "maximum height of profile (Ry)" as referred to herein means a value determined in accordance with JIS-B0601: 1994, with a cut-off λc of 0.8 mm and an evaluation length of 4 mm.

The lower limit of the maximum height of profile (Ry) of the external face (the back face of the back layer 13) on which the diffraction grating pattern 16 is formed, with respect to the direction perpendicular to the orientation of the multiple projection-recess patterned streaks is preferably 4 μm, more preferably 5 μm, and still more preferably 6 μm. On the other hand, the upper limit of the maximum height of profile (Ry) of the external face (the back face of the back layer 13) on which the diffraction grating pattern 16 is formed, with respect to the direction perpendicular to the orientation of the multiple projection-recess patterned streaks is preferably 12 μm, more preferably 10 μm, and still more preferably 9 μm. When the maximum height of profile (Ry) is less than the lower limit, the function of diffusing rays of light with respect to the direction perpendicular to the specific direction may be insufficient. To the contrary, when the maximum height of profile (Ry) is greater than the upper limit, it may be difficult to regulate the angles at which rays of light are emitted.

The lower limit of the difference between the maximum height of profile (Ry) of the external face (the back face of the back layer 13) on which the diffraction grating pattern 16 is formed, with respect to the direction perpendicular to the orientation of the multiple projection-recess patterned streaks, and the maximum height of profile (Ry) thereof with respect to the direction parallel to the orientation of the multiple projection-recess patterned streaks is preferably 4 μm, more preferably 5 μm, and still more preferably 6 μm. Due to the difference in the maximum height of profile (Ry) being no less than the lower limit, both the function of condensing rays of light with respect to the specific direction and the function of diffusing rays of light with respect to the direction perpendicular to the specific direction are readily enhanced. On the other hand, the upper limit of the difference in the maximum height of profile (Ry) may be, for example, 11 μm.

The upper limit of the ten-point average roughness (Rz) of the external face (the back face of the back layer 13) on which the diffraction grating pattern 16 is formed, with respect to the direction parallel to the orientation of the multiple projection-recess patterned streaks is preferably 2.5 μm, more preferably 2 μm, and still more preferably 1.5 μm. When the ten-point average roughness (Rz) is greater than the upper limit, the function of condensing rays of light with respect to the specific direction may be insufficient. On the other hand, the lower limit of the ten-point average roughness (Rz) of the external face (the back face of the back layer 13) on which the diffraction grating pattern 16 is formed, with respect to the direction parallel to the orientation of the multiple projection-recess patterned streaks may be, for example, 0.1 µm. The term "ten-point average roughness (Rz)" as referred to herein means a value determined in accordance with JIS-B0601: 1994, with a cut-off λc of 0.8 mm and an evaluation length of 4 mm.

The lower limit of the ten-point average roughness (Rz) of the external face (the back face of the back layer 13) on which the diffraction grating pattern 16 is formed, with respect to the direction perpendicular to the orientation of the multiple projection-recess patterned streaks is preferably 4 µm, more preferably 5 µm, and still more preferably 6 µm. The upper limit of the ten-point average roughness (Rz) of the external face (the back face of the back layer 13) on which the diffraction grating pattern 16 is formed, with respect to the direction perpendicular to the orientation of the multiple projection-recess patterned streaks is preferably 10 µm, more preferably 8 µm, and still more preferably 7 µm. When the ten-point average roughness (Rz) is less than the lower limit, the function of diffusing rays of light with respect to the direction perpendicular to the specific direction may be insufficient. To the contrary, when the ten-point average roughness (Rz) is greater than the upper limit, it may be difficult to regulate the angles at which rays of light are emitted.

The lower limit of the difference between the ten-point average roughness (Rz) of the external face (the back face of the back layer 13) on which the diffraction grating pattern 16 is formed, with respect to the direction perpendicular to the orientation of the multiple projection-recess patterned streaks, and the ten-point average roughness (Rz) thereof with respect to the direction parallel to the orientation of the multiple projection-recess patterned streaks is preferably 3 µm, more preferably 4 µm, and still more preferably 4.5 µm. Due to the difference in the ten-point average roughness (Rz) being no less than the lower limit, both the function of condensing rays of light with respect to the specific direction and the function of diffusing rays of light with respect to the direction perpendicular to the specific direction are readily enhanced. On the other hand, the upper limit of the difference in the ten-point average roughness (Rz) may be, for example, 9 µm.

The upper limit of the root mean square slope (RΔq) of the external face (the back face of the back layer 13) on which the diffraction grating pattern 16 is formed, with respect to the direction parallel to the orientation of the multiple projection-recess patterned streaks is preferably 0.5, more preferably 0.45, and still more preferably 0.4. When the root mean square slope (RΔq) is greater than the upper limit, the function of condensing rays of light with respect to the specific direction may be insufficient. On the other hand, the lower limit of the root mean square slope (RΔq) of the external face (the back face of the back layer 13) on which the diffraction grating pattern 16 is formed, with respect to the direction parallel to the orientation of the multiple projection-recess patterned streaks may be, for example, 0.05. The term "root mean square slope (RΔq)" as referred to means a value determined in accordance with JIS-B0601: 2001.

The lower limit of the root mean square slope (RΔq) of the external face (the back face of the back layer 13) on which the diffraction grating pattern 16 is formed, with respect to the direction perpendicular to the orientation of the multiple projection-recess patterned streaks is preferably 0.5, more preferably 0.7, and still more preferably 1. On the other hand, the upper limit of the root mean square slope (RΔq) of the external face (the back face of the back layer 13) on which the diffraction grating pattern 16 is formed, with respect to the direction perpendicular to the orientation of the multiple projection-recess patterned streaks is preferably 2.5, more preferably 2, and still more preferably 1.8. When the root mean square slope (RΔq) is less than the lower limit, the function of diffusing rays of light with respect to the direction perpendicular to the specific direction may be insufficient. To the contrary, when the root mean square slope (RΔq) is greater than the upper limit, it may be difficult to regulate the angles at which rays of light are emitted.

The lower limit of the difference between the root mean square slope (RΔq) of the external face (the back face of the back layer 13) on which the diffraction grating pattern 16 is formed, with respect to the direction perpendicular to the orientation of the multiple projection-recess patterned streaks, and the root mean square slope (RΔq) thereof with respect to the direction parallel to the orientation of the multiple projection-recess patterned streaks is preferably 0.5, more preferably 0.7, and still more preferably 1. Due to the difference in the root mean square slope (RΔq) being no less than the lower limit, both the function of condensing rays of light with respect to the specific direction and the function of diffusing rays of light with respect to the direction perpendicular to the specific direction are readily enhanced. On the other hand, the upper limit of the difference in the root mean square slope (RΔq) may be, for example, 2.2.

The lower limit of the haze value of the underlayer light diffusion sheet 4 is preferably 60%, more preferably 70%, and still more preferably 80%. On the other hand, the upper limit of the haze value of the underlayer light diffusion sheet 4 is preferably 95%, and more preferably 93%. Due to having such a high haze value, the underlayer light diffusion sheet 4 is apt to perform the further enhanced function of condensing rays of light with respect to the specific direction in the plane and the further enhanced function of diffusing rays of light with respect to the direction perpendicular to the specific direction.

Prism Sheet

Each of the first prism sheet 5 and the second prism sheet 6 includes a substrate layer and prism rows including protruding-streak prism portions overlaid on the front face of the substrate layer. Due to the need of transmitting rays of light, the substrate layers and the prism rows are formed to be transparent. The substrate layers and the prism rows are formed from a synthetic resin as a principal component. The prism rows of the first prism sheet 5 and the prism rows of the second prism sheet 6 are substantially orthogonal to each other. As mentioned above, the prism rows of the first prism sheet 5 are perpendicular to the specific direction. The first prism sheet 5 and the second prism sheet 6 each allow rays of light to be incident thereon at a preferred angle so as to direct the rays of light upward in the normal direction.

Upper-Layer Light Diffusion Sheet

The upper-layer light diffusion sheet 7 includes: a substrate layer; a light diffusion layer which is overlaid on the front face side of the substrate layer and contains beads and a binder for the beads; and a protective layer overlaid on the back face side of the substrate layer. The upper-layer light diffusion sheet 7 has a three-layer structure including the substrate layer, the light diffusion layer overlaid directly on the front face of the substrate layer, and the protective layer overlaid directly on the back face of the substrate layer, i.e., the upper-layer light diffusion sheet 7 does not include layers other than the substrate layer, the light diffusion layer and the protective layer. The upper-layer light diffusion sheet 7 is formed into a substantially rectangular shape in a planar view.

The substrate layer of the upper-layer light diffusion sheet 7 may have a configuration similar to that of the substrate layer 11 of the underlayer light diffusion sheet 4. The protective layer of the upper-layer light diffusion sheet 7 may have a configuration similar to that of the back layer 13 of the underlayer light diffusion sheet 4, except that the protective layer does not have the diffraction grating pattern 16. Meanwhile, the light diffusibility of the light diffusion layer of the upper-layer light diffusion sheet 7 does not need to be as high as that of the light diffusion layer 12 of the underlayer light diffusion sheet 4. Thus, the lower limit of the content of a light diffusing agent is preferably 5 parts by mass and more preferably 10 parts by mass, whereas the upper limit thereof is preferably 40 parts by mass and more preferably 30 parts by mass.

Light Guide Film

The light guide film 1 allows the rays of light incident on the end face to exit from the front face substantially uniformly. The light guide film 1 is formed into a plate-like shape (non-wedge shape) that is substantially rectangular in a planar view and has a substantially uniform thickness. The light guide film 1 includes, on the back face thereof, recessed portions 17 falling toward the front face side. In addition, the light guide film 1 includes, on the back face thereof, sticking preventive portions. Specifically, the light guide film 1 includes, as the sticking preventive portions, raised portions 18 provided to surround the recessed portions 17, and protruding toward the back face side. The raised portions 18 adjoin the recessed portions 17, with the forming face of each recessed portion 17 being continuous with the inner lateral face of each surrounding raised portion 18.

The recessed portions 17 function as a light scattering portion for scattering incident light toward the front face side. Each recessed portion 17 is formed into a substantially circular shape in a planar view. Furthermore, each recessed portions 17 is formed such that the diameter thereof gradually decreases toward the front face side. The shape of each recessed portion 17 is not particularly limited, and may be hemispherical, semielliptical, conical, frustoconical, or the like. Of these, the shape of each recessed portion 17 is preferably hemispherical or semielliptical. When the recessed portions 17 each have a hemispherical or semielliptical shape, the formability of the recessed portions 17 may be improved, and additionally rays of light incident on the recessed portions 17 can be favorably scattered.

The raised portions 18 are formed on the back face of the light-guiding sheet 1, so as to be continuous with the surface perpendicular to the thickness direction of the light-guiding sheet 1. Specifically, the raised portions 18 are formed so as to be continuous with the flat surface of the back face of the light-light guide film 1. The raised portions 18 are formed to be substantially annular in a planar view so as to surround the recessed portions 17. Since the raised portions 18 are formed to be substantially annular in a planar view so as to surround the recessed portions 17, the light guide film 1 is capable of easily and reliably preventing the recessed portions 17 and the vicinity of the recessed portions 17 from sticking to the reflection sheet 8 disposed on the back face side of the light guide sheet 1.

The light guide film 1 has flexibility. Owing to the flexibility, the light guide film 1 can inhibit generation of scratches on the reflection sheet 8 disposed on the back face side of the light guide film 1. Due to the need of transmitting rays of light, the light guide film 1 is formed to be transparent. The light guide film 1 is formed from a synthetic resin as a principal component.

LED Light Sources

The LED light sources 2 are disposed along the end face of the light guide film 1. Each of the LED light sources 2 is disposed in such a manner that a light emission surface thereof faces (or abuts) the end face of the light guide film 1.

Reflection Sheet

The reflection sheet 8 reflects, toward the front face side, the rays of light exiting from the back face side of the light guide film 1. The reflection sheet 8 is exemplified by: a white sheet in which a filler is dispersed in a base resin such as polyester; a mirror sheet obtained by vapor deposition of a metal such as aluminum and silver on the surface of a film formed from polyester to enhance regular reflection properties; and the like.

Function of Improving Face Luminance

Figure 5:
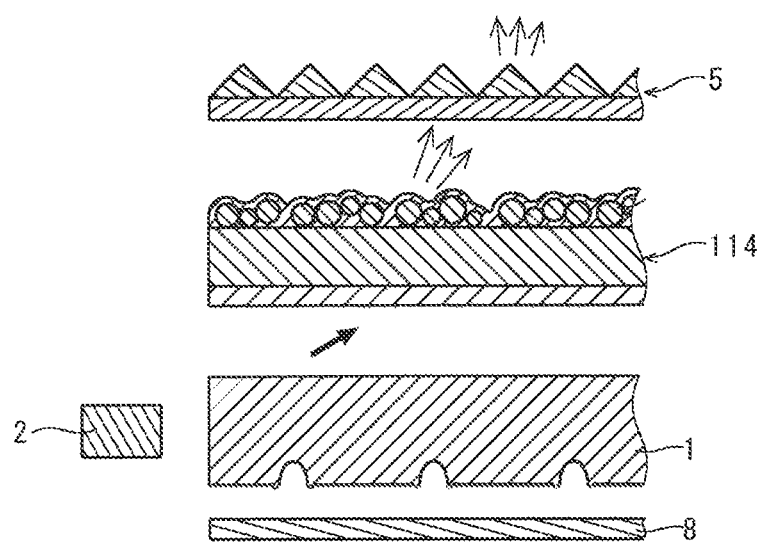
FIG. 5 is a schematic view for describing light emission properties of a conventional backlight unit.
Figure 6:
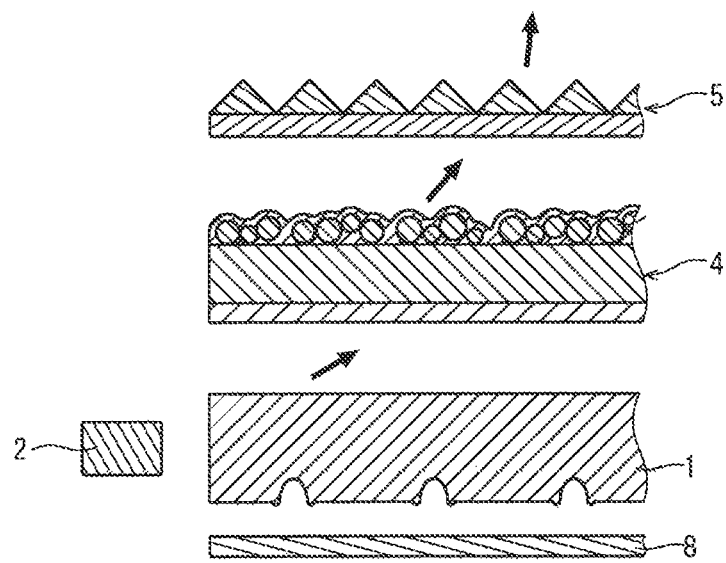
FIG. 6 is a schematic view for describing light emission properties of the backlight unit shown in FIG. 1.

With reference to FIGS. 5 and 6, the following will describe the underlayer light diffusion sheet 4 and its function of improving the face luminance of the backlight unit. First, with reference to FIG. 5, light emission properties of a backlight unit including a conventional underlayer light diffusion sheet 114 will be described. The rays of light emitted by the LED light sources 2 enter the light guide film 1 substantially perpendicularly from an end face (incidence end face) of the light guide film 1 opposed to the LED light sources 2, are then transmitted toward an end face opposite to the incidence end face, and exit from the front face of the light guide film 1. The rays of light exiting from the front face of the light guide film 1 have such a directivity that a large amount of the rays of light are inclined toward the light emission direction of the LED light sources 2. The rays of light exiting from the front face of the light guide film 1 enter the underlayer light diffusion sheet 114 from the back face thereof, are isotropically diffused, and then exit from the front face of the underlayer light diffusion sheet 114. However, due to the isotropic diffusion, the rays of light exiting the underlayer light diffusion sheet 114 are diffused in the direction parallel to the direction of the rays of light emitted by the LED light sources 2, leading to variations in the angle of incidence with respect to the prism rows of the first prism sheet 5. As a result, the first prism sheet 5 may fail to diffract the rays of light efficiently toward the normal direction. Thus, the backlight unit including the conventional underlayer light diffusion sheet 114 fails to produce a sufficient enhancement of the luminance in the front direction.

As shown in FIG. 6, the underlayer light diffusion sheet 4 has the function of diffusing rays of light with respect to the direction perpendicular to the rays of light emitted by the LED light sources 2 and the function of condensing rays of light with respect to the direction parallel to the direction of rays of light emitted by the LED light sources 2. In contrast to the conventional backlight unit in which a part of the rays of light fails to be incident on the prism rows at an optimum angle, the backlight unit including the underlayer light diffusion sheet 4 allows the rays of light to be incident on the prism rows at an optimum angle and to be diffused in the direction of the prism rows. Thus, in the backlight unit including the underlayer light diffusion sheet 4, the first prism sheet 5 is capable of efficiently refracting rays of light incident on the first prism sheet 5 toward the normal direction. The backlight unit including the underlayer light diffusion sheet 4 accordingly produces a sufficient enhancement of the luminance in the front direction.

Advantages

The backlight unit including the first prism sheet 5 disposed in such a manner that the direction of the prism rows is perpendicular to the direction of rays of light emitted by the LED light sources 2 is enabled to produce a sufficient enhancement of face luminance, owing to the optical sheet (the underlayer light diffusion sheet 4) being disposed on the back face side of the first prism sheet 5 in such a manner that the specific direction is perpendicular to the direction of the prism rows.

Since the optical sheet is the underlayer light diffusion sheet 4 including the substrate layer 11 and the light diffusion layer 12 overlaid on the front face side of the substrate layer 11, the optical sheet is apt to perform the enhanced function of condensing rays of light with respect to the specific direction and the enhanced function of diffusing rays of light with respect to the direction perpendicular to the specific direction. Specifically, due to the beads 14 and the binder 15 for the beads 14 being contained in the light diffusion layer 12, the optical sheet is apt to perform the more adequately enhanced function of condensing rays of light with respect to the specific direction and the more adequately enhanced function of diffusing rays of light with respect to the direction perpendicular to the specific direction.

The specific direction in the underlayer light diffusion sheet 4 is parallel to the direction of rays of light emitted by the LED light sources 2, and is perpendicular to the direction of the prism rows of the first prism sheet 5, whereby the rays of light transmitted through the underlayer light diffusion sheet 4 are condensed in the direction perpendicular to the direction of the prism rows of the first prism sheet 5 and are diffused in the direction of the prism rows. Consequently, the backlight unit is enabled to produce a sufficient enhancement of face luminance.

Production Method of Underlayer Light Diffusion Sheet

Next, the production method of the underlayer light diffusion sheet 4 will be described. The production method of the underlayer light diffusion sheet includes: feeding a resin film, providing an ultraviolet ray-curable resin composition, irradiating the resin composition with ultraviolet rays, and overlaying a light diffusion layer.

Production Device

Figure 7:
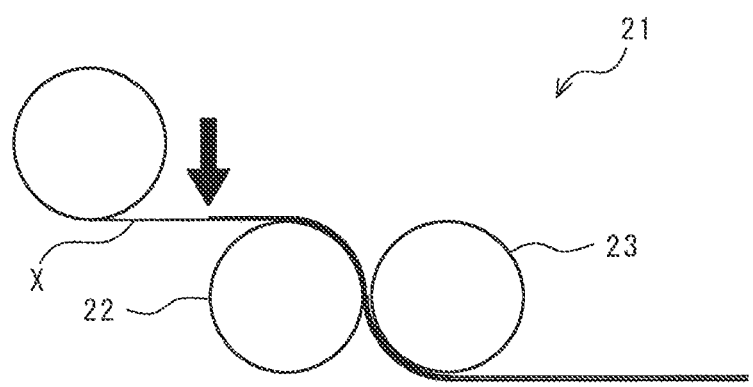
FIG. 7 is a schematic view of a device for producing the light diffusion sheet shown in FIG. 2.

The production method of the underlayer light diffusion sheet is implemented by using, for example, a production device 21 shown in FIG. 7. The production device 21 includes a pair of press rollers 22 and 23 adjacently disposed in parallel with each other. The pair of press rollers 22 and 23 each include a temperature control means, thereby being capable of optimizing the surface (circumferential surface) temperature. It is preferred that metal flexible rollers each including a metal roller and a flexible roller covered with an elastic body are used as the pair of press rollers 22 and 23. The press roller 23 includes, on the surface thereof, a reversal shape of the underlayer light diffusion sheet 4 having the diffraction grating pattern 16.

Feeding Resin Film

In feeding a resin film, a strip-shaped resin film X is fed onto the surfaces of the press rollers 22 and 23 forming a pair. Specifically, in feeding a resin film, the resin film X for forming the substrate layer 11 of the underlayer light diffusion sheet 4 is fed so as to be sandwiched between the pair of press rollers 22 and 23.

Providing Ultraviolet Ray-Curable Resin Composition

In providing an ultraviolet ray-curable resin composition, an ultraviolet ray-curable resin composition is provided between the resin film X and the press roller 23. In providing the ultraviolet ray-curable resin composition, the resin film X and the ultraviolet ray-curable resin composition provided on a surface on one side of the resin film X are pressed by the pair of press rollers 22 and 23. In providing the ultraviolet ray-curable resin composition, the diffraction grating pattern 16 is transferred to an external face (surface on the one side) of the ultraviolet ray-curable resin composition overlaid on the surface on the one side of the resin film X.

Irradiating Resin Composition with Ultraviolet Rays

In irradiating the resin composition with ultraviolet rays, the ultraviolet ray-curable resin composition having the diffraction grating pattern 16 transferred thereto in the step mentioned above is irradiated with ultraviolet rays, whereby the ultraviolet ray-curable resin composition is cured. By irradiating the resin composition with ultraviolet rays, the diffraction grating pattern 16 is formed on the one side of the resin film X.

Overlaying Light Diffusion Layer

In overlaying the light diffusion layer subsequent to the irradiation of the resin composition with ultraviolet rays, a coating liquid containing the beads 14 and a binder composition is applied onto the face on a surface on another side of the resin film X, and the coating liquid thus applied is dried and cured. In this step, the light diffusion layer 12 is overlaid on the surface on the another side of the resin film X.

Advantages

The production method of an underlayer light diffusion sheet allows easy and reliable production of the underlayer light diffusion sheet 4 that enables the backlight unit to produce a sufficient enhancement of face luminance.

Second Embodiment

Underlayer Light Diffusion Sheet

Figure 8:
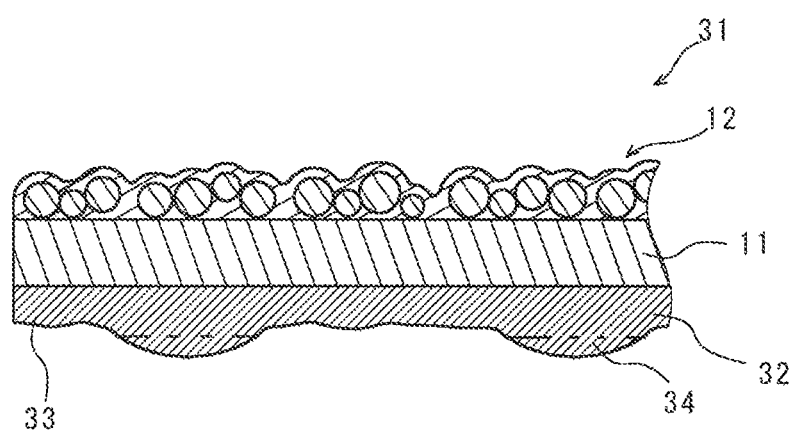
FIG. 8 is a schematic partial end view of a light diffusion sheet according to an embodiment distinct from the light diffusion sheet shown in FIG. 2.

In place of the underlayer light diffusion sheet 4 shown in FIG. 2, an underlayer light diffusion sheet 31 shown in FIG. 8 may be included in the backlight unit shown in FIG. 1. The underlayer light diffusion sheet 31 includes: the substrate layer 11; the light diffusion layer 12 disposed on the front face side of the substrate layer 11; and a back layer 32 overlaid on the back face side of the substrate layer 11. The underlayer light diffusion sheet 31 is provided with, on the back face of the back layer 32 (the back face of the underlayer light diffusion sheet 31), protruding portions 34 disposed in a dispersed manner and serving as a sticking preventive portion. The protruding portions 34 are integrally formed on the back layer 32, i.e., the protruding portions 34 are formed to be integral with the back layer 32. The light guide 31 is formed into a substantially rectangular shape in a planar view. The underlayer light diffusion sheet 31 is composed of the substrate layer 11, the light diffusion layer 12, the back layer 32 and the protruding portions 34, i.e., the underlayer light diffusion sheet 31 does not include layers other than the substrate layer 11, the light diffusion layer 12, the back layer 32 and the protruding portions 34. The substrate layer 11 and the light diffusion layer 12 of the underlayer light diffusion sheet 31 are similar to those of the light diffusion sheet 4 shown in FIG. 2, and thus these layers are denoted by the same reference numerals and will not be further elaborated here.

The specific direction in a plane of the underlayer light diffusion sheet 31 is parallel to the direction of rays of light emitted by the LED light sources. The specific direction in the underlayer light diffusion sheet 31 is perpendicular to the direction of the prism rows of the first prism sheet which is disposed directly on the front face side of the underlayer light diffusion sheet 31 (without any other optical sheets between the underlayer light diffusion sheet 31 and the first prism sheet). The underlayer light diffusion sheet 31 is an optical sheet which is for use in a liquid crystal display device and has specific optical functions on transmitted rays of light (rays of light that are incident from the back face side and exit from the front face side). The optical functions include a function of condensing rays of light with respect to the specific direction in the plane, and a function of diffusing rays of light with respect to the direction perpendicular to the specific direction.

Due to the need of transmitting rays of light, back layer 32 is formed to be transparent. The back layer 32 is formed from a synthetic resin as a principal component. The principal component of the resin layer 32 may be similar to that of the back layer 13 of the underlayer diffusion sheet 4 mentioned above.

The underlayer light diffusion sheet 31 has a multi-streak diffraction grating pattern 33 oriented in the specific direction and disposed on the back face of the back layer 32 not having been provided with the protruding portions 34. The diffraction grating pattern 33 includes multiple projection-recess patterned streaks extending in the specific direction. Due to the underlayer light diffusion sheet 31 having the diffraction grating pattern 33, the rays of light incident on the diffraction grating pattern 33 are diffused in the width direction of the diffraction grating pattern 33 (the direction perpendicular to the average orientation of the multiple projection-recess patterned streaks). The underlayer light diffusion sheet 31 accordingly has the function of condensing rays of light with respect to the specific direction and the function of diffusing rays of light with respect to the direction perpendicular to the specific direction. The specific shape of the diffraction grating pattern 33 is similar to that of the diffraction grating pattern of the underlayer light diffusion sheet 4 shown in FIG. 2, and will not be elaborated here.

Figure 9:
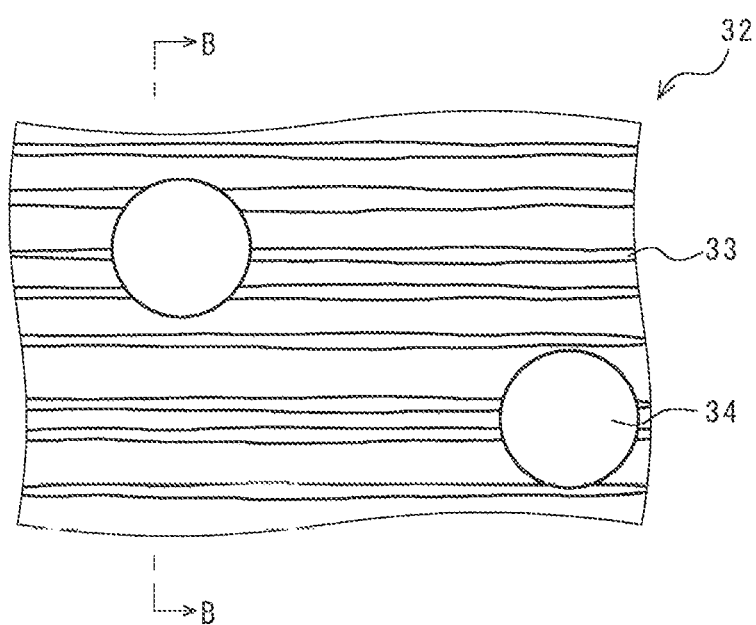
FIG. 9 is a schematic rear view of the light diffusion sheet shown in FIG. 8.
Figure 10:
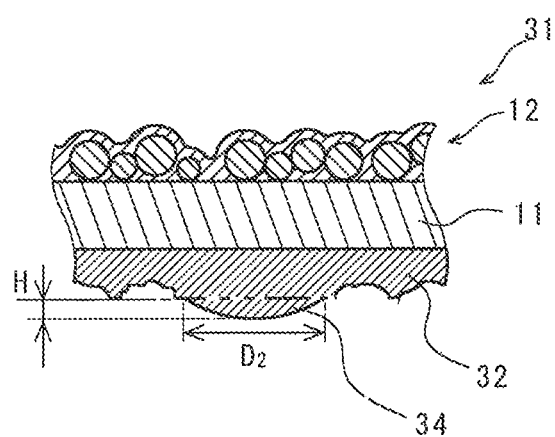
FIG. 10 is a partial end view taken along a line B-B of the light diffusion sheet shown in FIG. 9.

As shown in FIGS. 9 and 10, each of the protruding portions 34 has a shape of a half oblate spheroid. The protruding portions 34 are provided randomly (in an irregular pattern) on the back face of the back layer 32. Due to the protruding portions 34 being randomly provided, the underlayer light diffusion sheet 31 is capable of preventing the occurrence of moire caused by the protruding portions 34. The term "half oblate spheroid" as referred to herein means a shape obtained by cutting in half a virtual spheroid generated by revolution of an ellipse about its minor axis, across a vertical plane including the major axis perpendicular to the minor axis. The term "half spheroid" as referred herein means not only a half spheroid in a strict sense but also a domed shape formed by a base being a perfect circle and an external face being curved.

The lower limit of the average radius of curvature of the tips of the protruding portions 34 is preferably 5 μm, and more preferably 10 μm. On the other hand, the upper limit of the average radius of curvature of the tips of the protruding portions 34 is preferably 50 μm, and more preferably 25 μm. When the average radius of curvature is less than the lower limit, the front face of the light guide film disposed on the back face side of the underlayer light diffusion sheet 31 may be scratched. To the contrary, when the average radius of curvature is greater than the upper limit, an area in which the raised portions 34 abut the front face of the light guide film may be increased, and thus rays of light incident on the abutment sites may cause the lack in uniformity of luminance. The term "average radius of curvature of the tips of the protruding portions" as referred to herein means a value obtained by measuring the radius of curvature of each of randomly chosen 10 protruding portions at a part farthest from the back face on average level of the back layer and averaging the radii thus measured.

The lower limit of an average diameter $D_2$ of the protruding portions 34 is preferably 25 μm, more preferably 27 μm, and still more preferably 30 μm. On the other hand, the upper limit of the average diameter $D_2$ of the protruding portions 34 is preferably 45 μm, more preferably 42 μm, and still more preferably 40 μm. When the average diameter $D_2$ of the protruding portions 34 is less than the lower limit, the radius of curvature of the tip of each protruding portion 34 is too small in return for a height H of the protruding portion 34 being sufficiently great. Consequently, the front face of the light guide film disposed on the back face side of the underlayer light diffusion sheet 31 may be scratched. To the contrary, when the average diameter $D_2$ of the protruding portion 34 is greater than the upper limit, the height H of each protruding portion 34 is too great in return for the radius of curvature of the tip of the protruding portion 34 falling within a desired range. Consequently, the requirement for a reduction in the thickness of the backlight unit may not be satisfied. The term "diameter" of each protruding portion as referred to herein means a diameter measured at the base. The term "average diameter of the protruding portions" as referred to herein means a value obtained by calculating the mean value from the maximum diameter and the minimum diameter at the base of each of randomly chosen 10 protruding portions and averaging the mean values thus calculated.

The lower limit of the average height H of the protruding portions 34 is preferably 2 μm, and more preferably 3 μm. On the other hand, the upper limit of the average height H of the protruding portions 34 is preferably 5 μm, and more preferably 4 μm. When the average height H of the protruding portions 34 is less than the lower limit, the underlayer light diffusion sheet 31 is likely to abut the light guide film at not only the protruding portions 34 but also other sites, and thus ray of light incident on the abutment sites may cause the lack in uniformity of luminance. To the contrary, when the average height H of the protruding portion 34 is greater than the upper limit, the requirement for a reduction in thickness of the backlight unit may not be satisfied. The term "height" of each protruding portion as referred to herein means the distance between the base and the projection edge of the protruding portion, and the term "average height of the protruding portions" as referred to herein means a value obtained by measuring the distance between the base and the projection edge of each of randomly chosen 10 protruding portions and averaging the distances thus measured.

As to the height H, the protruding portions 34 are preferably of a uniform height. The upper limit of a coefficient of variation of the height H of the protruding portions 34 is preferably 0.2, more preferably 0.1, and still more preferably 0.05. When the coefficient of variation of the height H of the protruding portions 34 is greater than the upper limit, nonuniformity in the height H of the protruding portions 34 may be produced, so that the load may be shifted onto the higher raised portions 34 and the front face of the light guide film may be scratched accordingly. On the other hand, the lower limit of coefficient of variation of the height H of the protruding portions 34 is not particularly limited, and may be, for example, 0. The term "coefficient of variation" of the height of the protruding portions as referred to herein means a value obtained by dividing the standard deviation of the heights of the protruding portions measured at randomly chosen 20 points by the average height of the same.

The lower limit of the ratio ($H/D_2$) of the average height H to the average diameter $D_2$ of the protruding portions 34 is preferably 0.08, and more preferably 0.09. On the other hand, the upper limit of the ratio ($H/D_2$) is preferably 0.2, more preferably 0.15, and still more preferably 0.12. To the contrary, when the ratio ($H/D_2$) is less than the upper limit, an area in which the raised portions 34 abut the front face of the light guide film may be increased, and thus rays of light incident on the abutment sites may cause the lack in uniformity of luminance. To the contrary, when the ratio ($H/D_2$) is greater than the upper limit, the tips of the protruding portions 34 may be too sharp, leading to generation of scratches on the front face of the light guide film.

The lower limit of the average pitch of the protruding portions 34 is preferably 100 μm, more preferably 200 μm, and still more preferably 300 μm. On the other hand, the upper limit of the average pitch of the protruding portions 34 is preferably 1.0 mm, more preferably 0.7 mm, and still more preferably 0.5 mm. When the average pitch of the protruding portions 34 is less than the lower limit, the protruding portions 34 may be too great in number, leading to generation of scratches on the front face of the light guide film. To the contrary, when the average pitch of the protruding portions 34 is greater than the upper limit, the protruding portions 34 may be deficient in number, and sticking may not be sufficiently prevented. The term "average pitch" of the protruding portions as referred to herein means a value obtained by measuring the pitch between each of randomly chosen 10 protruding portions and the protruding portion closest to the protruding portion concerned and averaging the pitches thus measured.

The lower limit of the proportion of the area of the protruding portions 34 is preferably 2%, more preferably 3%, and still more preferably 4%. On the other hand, the upper limit of the proportion of the area of the protruding portions 34 is preferably 10%, more preferably 8%, and still more preferably 6%. When the proportion of the area of the protruding portions 34 is less than the lower limit, sticking may not be sufficiently prevented. To the contrary, when the proportion of the area of the protruding portions 34 is greater than the upper limit, the front face of the light guide film may be scratched. The term "proportion of the area of the protruding portions" as referred to herein means the proportion of the area of the protruding portions to the plane area of the surface on which the protruding portions are formed.

The lower limit of the ratio of the average diameter $D_2$ of the protruding portions 34 to the mean particle diameter of the beads 14 is preferably 3, more preferably 4, and still more preferably 5. On the other hand, the upper limit of the ratio is preferably 9, more preferably 8, and still more preferably 7. When the ratio is less than the lower limit, the rays of light incident on the protruding portions 34 may be deficient in quantity, leading to insufficient introduction of light by the protruding portions 34. To the contrary, when the ratio is greater than the upper limit, the curvature of the protruding portions 34 may be too gentle, leading to poor introduction of rays of light by the protruding portions 34.

The protruding portions 34 are formed from a synthetic resin as a principal component. The protruding portions 34 contain no beads. Since the protruding portions 34 containing no beads, the underlayer light diffusion sheet 31 is enabled to prevent the front face of the light guide film disposed on the back face side of the underlayer light diffusion sheet 31 from being scratched due to detachment of beads.

Production Method of Underlayer Light Diffusion Sheet

Next, the production method of the underlayer light diffusion sheet 31 will be described. The production method of the underlayer light diffusion sheet 31 includes: feeding a resin film, providing an ultraviolet ray-curable resin composition, irradiating the resin composition with ultraviolet rays, and overlaying a light diffusion layer. The underlayer light diffusion sheet 31 may be produced in a manner similar to the production method of the underlayer light diffusion sheet 4, except that the press roller 23 is replaced with a press roller which has, on the surface thereof, a reversal shape of the back face of the underlayer light diffusion sheet 31 provided with the protruding portions 34 and the diffraction grating pattern 33.

Advantages

The backlight unit including the first prism sheet disposed in such a manner that the direction of the prism rows is perpendicular to the direction of rays of light emitted by the LED light sources is enabled to produce a sufficient enhancement of face luminance, owing to the underlayer light diffusion sheet 31 being disposed on the back face side of the first prism sheet in such a manner that the specific direction is perpendicular to the direction of the prism rows. Since the underlayer light diffusion sheet 31 is provided with, on the back face thereof, the protruding portions 34 disposed in a dispersed manner, the underlayer light diffusion sheet 31 partially abuts, via the protruding portions 34, the light guide film disposed on the back face side of the underlayer light diffusion sheet 31. Thus, the sticking of the underlayer light diffusion sheet 31 to the light guide film on the back face side can be prevented. Due to the protruding portions 34 being half oblate spheroids, the curved faces at the tips (lower ends) of the protruding portions 34 are relatively gentle, and thus, the underlayer light diffusion sheet 31 is enabled to prevent generation of scratches on the front face of the light guide film on the back face side.

The production method of an underlayer light diffusion sheet allows easy and reliable production of the underlayer light diffusion sheet 31 that enables the backlight unit to produce a sufficient enhancement of face luminance and prevents the sticking to the light guide film on the back face side while preventing generation of scratches on the light guide film.

Third Embodiment

Underlayer Light Diffusion Sheet

Figure 11:
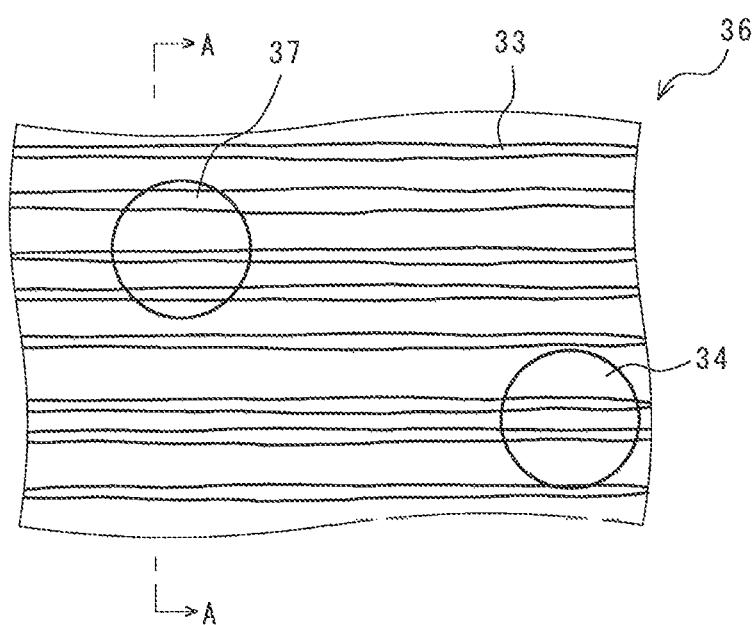
FIG. 11 is a schematic rear view of the light diffusion sheet according to an embodiment distinct from the light diffusion sheets shown in FIGS. 2 and 8.

In place of the underlayer light diffusion sheet 4 shown in FIG. 2 or the underlayer light diffusion sheet 31 shown in FIG. 8, an underlayer light diffusion sheet 36 shown in FIG. 11 may be included in the backlight unit shown in FIG. 1. The configuration of the light diffusion sheet 36 is similar to the configuration of the underlayer light diffusion sheet 31 shown in FIG. 8, except that the light diffusion sheet 36 has, on the back face side of the protruding portions 34, a diffraction grating pattern 37 that is continuous with the diffraction grating pattern 33.

Production Method of Light Diffusion Sheet

Next, the production method of the underlayer light diffusion sheet 36 will be described. The production method of the underlayer light diffusion sheet 36 includes: feeding a resin film, providing an ultraviolet ray-curable resin composition, irradiating the resin composition with ultraviolet rays, and overlaying a light diffusion layer. The underlayer light diffusion sheet 36 may be produced in a manner similar to the production method of the underlayer light diffusion sheet 4, except that the press roller 23 is replaced with a press roller which has, on the surface thereof, a reversal shape of the back face of the underlayer light diffusion sheet 36 provided with the protruding portions 34, the diffraction grating pattern 33 and the diffraction grating pattern 37 that is formed on the back face side of the protruding portions 34 so as to be continuous with the diffraction grating pattern 33.

Advantages

The light diffusion sheet 36 includes, on the back face side of the protruding portions 34, the diffraction grating pattern 37 that is continuous with the diffraction grating pattern 33, whereby the backlight unit is enabled to produce an appropriate enhancement of face luminance.

Other Embodiments

It is to be noted that the optical sheets and the backlight unit according to the embodiments of the present invention may be exploited in various modified or improved embodiments other than those as described above. For example, the optical sheets are not limited to the underlayer light diffusion sheets having the configurations described above, and may be, e.g., micro lens sheets each including a micro lens array disposed on the front face side of a base layer.

The optical sheet may include layers other than those of the above-described embodiments. For example, the optical sheet may include a resin layer disposed between the base layer and the optical layer (e.g., the light diffusion layer, the prism rows, and the micro lens array) and/or a resin layer disposed between the base layer and the back layer.

It is not always required that the light diffusion layer is overlaid on the front face side of the base layer. The light diffusion layer may be overlaid on the back face side of the base layer. Alternatively, it is not always required that the light diffusion layer contains beads and a binder for the beads. The light diffusion layer may have, on the external face thereof, a pattern of projections and recesses formed by emboss processing.

The back layer of the optical sheet may be omitted. The configuration in which the back layer is omitted may be exemplified by a configuration in which a diffraction grating pattern is formed on the back face of the base layer. Also, the configuration in which the back layer is omitted may be exemplified by a configuration in which a diffraction grating pattern and the protruding portions are formed on the back face of the base layer. The production method of an optical sheet including no back layer is exemplified by an extrusion molding process in which a resin composition for forming a base layer is extruded from a T-die, and then is sandwiched between one press roller, which has on the front face thereof a reversal shape of the diffraction grating pattern or reversal shapes of the diffraction grating pattern and the protruding portions, and the other press roller, such that the resin composition has the reversal shape(s) transferred thereto.

The sticking preventive portion, which may be included in the optical sheet, may have any shape other than the shapes described in the aforementioned embodiments. For example, the optical sheet may include, as the sticking preventive portion, protruding portions 44, 54, 64 and 74 shown in FIGS. 12 to 15.

Figure 12:
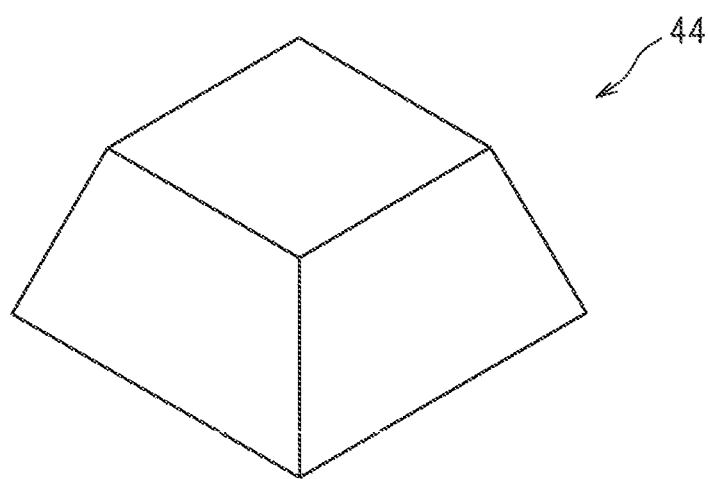
FIG. 12 is a schematic perspective view of an example of protruding portions of the light diffusion sheets shown in FIGS. 8 and 11.

The protruding portion 44 shown in FIG. 12 is formed into a truncated pyramid. Specifically, the protruding portion 44 is formed into a truncated square pyramid, with a base area on the proximal end being greater than a base area on the distal end. The lower limit of the average height of the protruding portions 44 is preferably 2 μm, and more preferably 3 μm. On the other hand, the upper limit of the average height thereof is preferably 10 μm, and more preferably 7 μm. When the average height is less than the lower limit, sufficient sticking prevention effects may not be produced. To the contrary, when the average height is greater than the upper limit, the protruding portions 44 may be unnecessarily large.

As to the protruding portions 44, the lower limit of the ratio of the average height to the average length of one side of the base on the proximal end of is preferably 0.05, and more preferably 0.1. On the other hand, the upper limit of the ratio is preferably 1, more preferably 0.7, and still more preferably 0.5. When the ratio is less than the lower limit, sufficient sticking prevention effects may not be produced. To the contrary, when the ratio is greater than the upper limit, scratches may be generated on the front face of a member disposed on the back face side.

Figure 13:
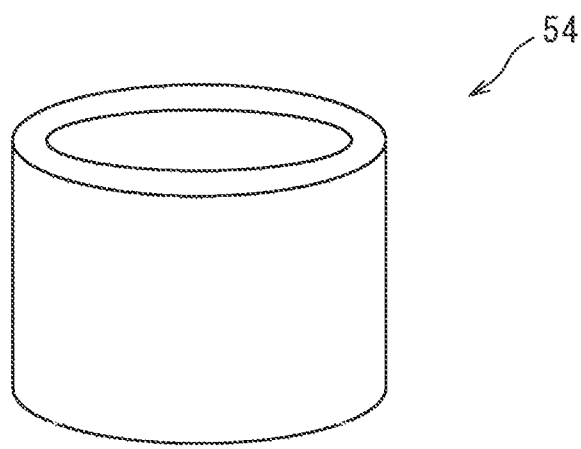
FIG. 13 is a schematic perspective view of a protruding portion according to an embodiment distinct from the protruding portion shown in FIG. 12.

The protruding portion 54 shown in FIG. 13 is formed into a tubular shape. Specifically, the protruding portion 54 is formed into a cylindrical shape. The average height of the protruding portions 54 may be similar to the average height of the protruding portions 44. The ratio of the average height to the average diameter of the protruding portions 54 may be similar to the ratio of the average height to the average length of one side of the base on the proximal end of the protruding portions 44.

Figure 14:
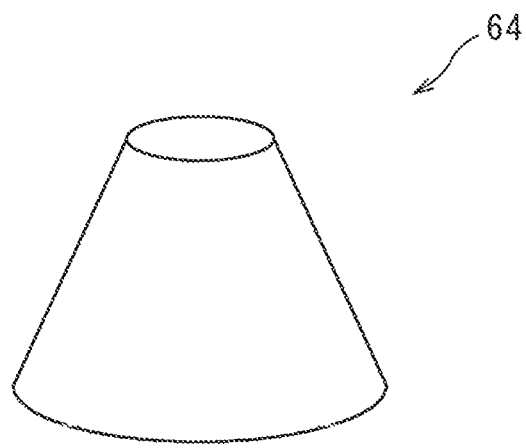
FIG. 14 is a schematic perspective view of a protruding portion according to an embodiment distinct from the protruding portions shown in FIGS. 12 and 13.

The protruding portion 64 shown in FIG. 14 is formed into a truncated cone, with a base area on the proximal end being greater than a base area on the distal end. The average height of the protruding portions 64 may be similar to the average height of the protruding portions 44. The ratio of the average height to the average diameter on the distal end of the protruding portions 64 may be similar to the ratio of the average height to the average length of one side of the base on the proximal end of the protruding portions 44.

Figure 15:
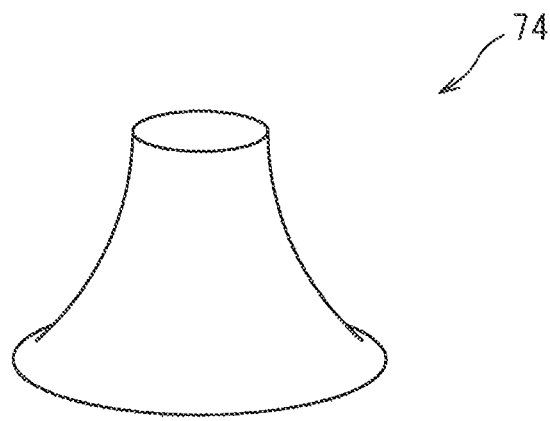
FIG. 15 is a schematic perspective view of a protruding portion according to an embodiment distinct from the protruding portions shown in FIGS. 12 to 14.

The protruding portion 74 shown in FIG. 15 is trumpet-shaped, with the diameter gradually decreasing from the proximal end to the distal end. The average height of the protruding portions 74 may be similar to the average height of the protruding portions 44. The ratio of the average height to the average diameter on the proximal end of the protruding portions 74 may be similar to the ratio of the average height to the average length of one side of the base on the proximal end of the protruding portions 44.

It is also preferred that optical sheet is disposed on the back face of a sheet body including two prism sheets bonded to each other. The sheet body including two prism sheets bonded to each other is inferior in masking properties due to an air layer being less likely to be formed between the prism sheets. Meanwhile, the optical sheet disposed on the back face of the sheet body is capable of diffusing rays of light in the width direction of the diffraction grating pattern, whereby the backlight unit is enabled to produce a sufficient improvement of masking properties. In the case where the optical sheet is disposed on the back face of the sheet body including two prism sheets bonded to each other, the direction of the prism rows of one prism sheet closer to the back face side than the other prism sheet is preferably perpendicular to the specific direction in the plane.

The optical sheet may have a diffraction grating pattern formed on the region other than the back face. For example, a diffraction grating pattern may be formed on the front face of the base layer or on the back face of the optical layer (e.g., the light diffusion layer, the prism rows, and the micro lens array) of the optical sheet.

Figure 16:
FIG. 16 is a schematic end view of a diffraction grating pattern according to other embodiment of the present invention.
Figure 17:
FIG. 17 is a schematic end view of a diffraction grating pattern according to an embodiment distinct from the diffraction grating pattern shown in FIG. 16.
Figure 18:
FIG. 18 is a schematic end view of a diffraction grating pattern according to an embodiment distinct from the diffraction grating patterns shown in FIGS. 16 and 17.

The specific shape of the diffraction grating pattern is not limited to the shapes described in the aforementioned embodiments, and may include recessed portions each having a squared U-shaped cross section as shown in FIG. 16, recessed portions each having a triangular cross section as shown in FIG. 17, and recessed portions formed into slits as shown in FIG. 18. The multiple projection-recess patterned streaks may be oriented so as to be perpendicular to the direction of rays of light emitted by the light sources.

Although the backlight unit preferably includes a plurality of LED light sources, the backlight may include only one LED light source. The specific kind of the optical sheet of the backlight unit is not particularly limited. Although the backlight unit preferably includes a plurality optical sheets on the front face side of the light guide film, the backlight unit may include only one optical sheet.

The backlight unit is not necessarily an edge-lit backlight unit, and may be, for example, a direct-lit backlight unit.

In the case where the backlight unit is of the edge-lit type, the backlight unit is not necessarily a one-side edge-lit backlight unit provided with LED light sources disposed along only one end face of the light guide film. Alternatively, the backlight unit may be a bilateral edge-lit backlight unit in which the LED light sources are disposed along a pair of opposing end faces of the light guide film, or may be an entire circumferential edge-lit backlight unit provided with LED light sources disposed along the end faces of the light guide film.

The backlight unit may be included in a comparatively large-sized visual display unit such as a personal computer or a liquid crystal television, or may be included in a mobile phone terminal such as a smartphone or a personal digital assistance such as a tablet terminal.

EXAMPLES

Hereinafter, the embodiments of the present invention will be described in more detail by way of Examples; however, the present invention is not in any way limited to these Examples.

Example

A resin film containing polyethylene terephthalate as a principal component was fed onto the surface of one press roller, which had on the front face thereof a reversal shape of a diffraction grating pattern, and onto the surface of another press roller. Then, an ultraviolet ray-curable resin composition was provided between the one press roller and the resin film. The resin film with the ultraviolet ray-curable resin overlaid thereon was pressed by a pair of press rollers, whereby the diffraction grating pattern was transferred to the external face of the ultraviolet ray-curable resin composition. Subsequently, the ultraviolet ray-curable resin composition having the diffraction grating pattern transferred thereto was irradiated with ultraviolet rays, whereby the ultraviolet ray-curable resin composition was cured. Furthermore, a coating liquid containing beads and a binder for the beads was applied to a surface of the resin film with no ultraviolet ray-curable resin composition overlaid thereon, and the coating liquid thus applied was dried and cured to form a light diffusion layer, whereby the light diffusion sheet of Example was obtained. In the light diffusion sheet, the average width of recessed portions of multiple projection-recess patterned streaks that constitute the diffraction grating pattern was 9.3 μm, the average depth of the recessed portions was 2.8 μm, the average pitch was 9.3 μm, the standard deviation of the pitches of the multiple projection-recess patterned streaks was 6.54 μm, the standard deviation of the depths of the multiple projection-recess patterned streaks was 1.13 μm, and the arithmetic average roughness (Ra) in the direction perpendicular to the orientation of the multiple projection-recess patterned streaks was 1.34 μm.

Comparative Example

A light diffusion sheet of Comparative Example was obtained as in Example, except that a diffraction grating pattern was not formed.

Characteristics of Outgoing Rays of Light

Figure 19:
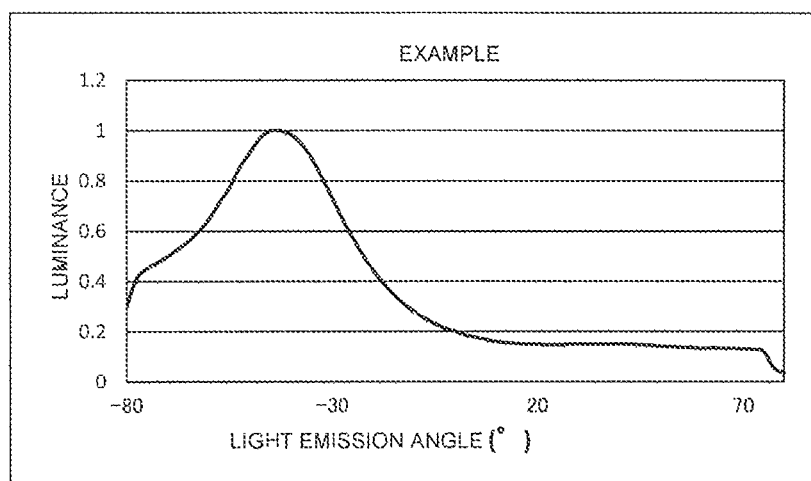
FIG. 19 is a graph showing a relationship between the luminance and the light emission angle of a light diffusion sheet of Example.
Figure 20:
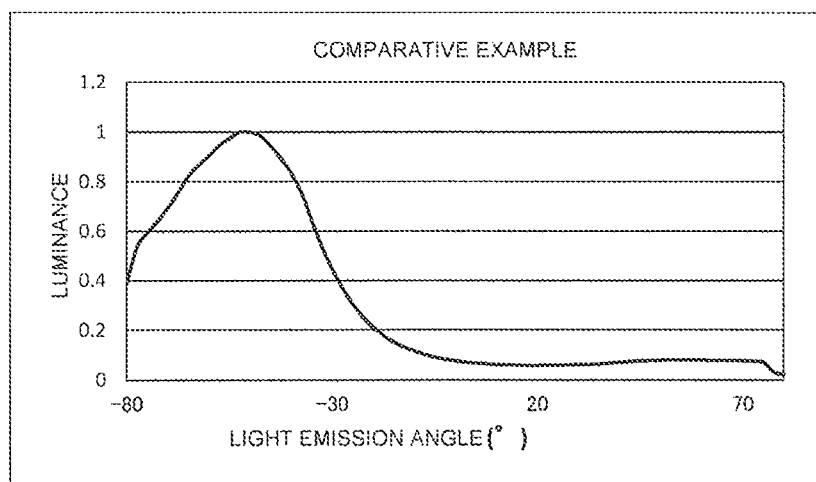
FIG. 20 is a graph showing a relationship between the luminance and the light emission angle of a light diffusion sheet of Comparative Example.
Figure 21:
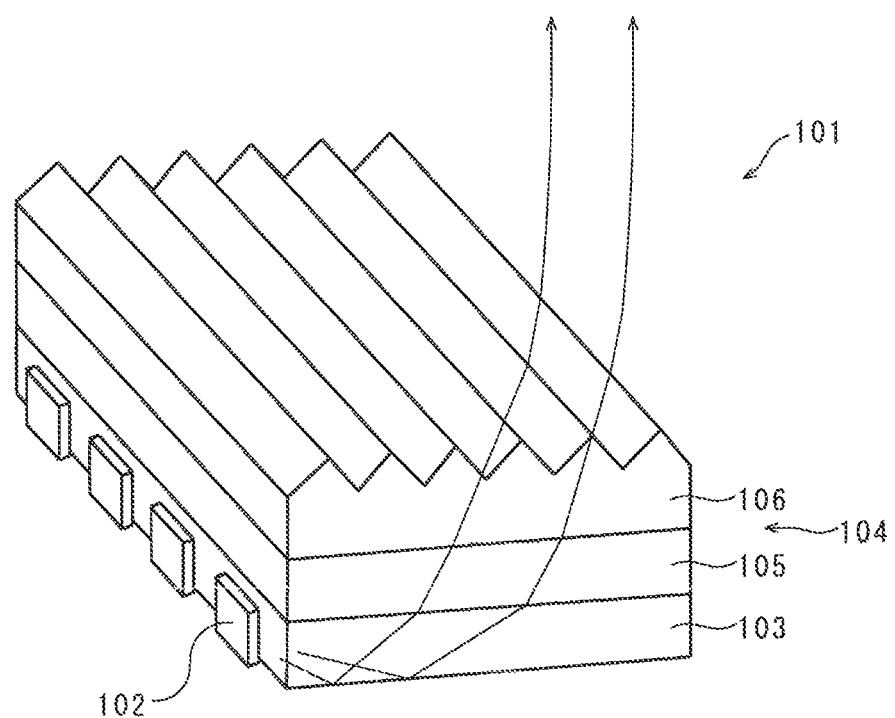
FIG. 21 is a schematic perspective view of a conventional edge-lit backlight unit.

The light diffusion sheets of Example and Comparative Example were each disposed on the front face of a light guide film of an edge-lit backlight unit provided with LED light sources disposed along one end face of the light guide film. The light diffusion sheet of Example was disposed in such a manner that the average orientation of the multiple projection-recess patterned streaks was parallel to the direction of rays of light emitted by the LED light sources. In such a state, the LED light sources emitted rays of light, and the relationship between the luminance and the light emission angle of each light diffusion sheet was determined by using "EZContrast" available from ELDIM through measurement of viewing angle characteristics within a range from 80° to −80°, with the LED light source side of the direction of rays of light emitted by the LED light sources being at an angle of 90°, the light emission direction side being at an angle of −90°, and the light emission face of the backlight unit being at an angle of 0°. FIG. 19 shows the relationship between the luminance and the light emission angle of the light diffusion sheet of Example, and FIG. 20 shows the relationship between the luminance and the light emission angle of the light diffusion sheet of Comparative Example. Tables 1 shows the maximum light emission angle determined through the measurement of viewing angle characteristics.

Luminance of Backlight

The light diffusion sheets of Example and Comparative Example were each disposed between a light guide film and a prism sheet of a backlight unit mounted to "iPhone (registered trademark) 6" available from Apple Inc., and the backlight unit was lit by using a stabilized DC power supply ("PAR36-3A" available from TEXIO TECHNOLOGY CORPORATION), with a current of 40 mA and a voltage of 18.05 V. The luminance of the central part of the light emission face of the backlight unit was measured at a measurement angle of 0.2°, by using "Color Luminance Meter BM-7" available from TOPCON TECHNOHOUSE CORPORATION, which was disposed at a distance of 1 m from the backlight in the direction perpendicular to the light emission face of the backlight unit. The results of the measurement are shown in Table 1.

TABLE 1

|  | Maximum Light Emission Angle (°) | Luminance of Backlight (cd/m$^2$) |
| --- | --- | --- |
| Example | −42.5 | 12,686 |
| Comparative Example | −52.5 | 11,316 |

Evaluation Results

FIGS. 19 and 20 and Table 1 suggest that the light diffusion sheet of Example was superior to the light diffusion sheet of Comparative Example in the function of condensing rays of light toward the normal direction, and enabled the backlight unit to produce an improvement of luminance. FIGS. 19 and 20 and Table 1 also suggest that the light diffusion sheet of Example was superior to the light diffusion sheet of Comparative Example in the function of condensing rays of light with respect to the direction of rays of light emitted by the LED light sources and the function of diffusing rays of light with respect to the direction perpendicular to the direction of rays of light emitted by the LED light sources.

INDUSTRIAL APPLICABILITY

As described in the foregoing, the optical sheets according to the embodiments of the present invention enable the backlight unit to produce a sufficient enhancement of face luminance, and are thus suited for various types of liquid crystal display devices such as high-quality transmissive liquid crystal display devices.

EXPLANATION OF THE REFERENCE SYMBOLS 1 light guide film
2 LED light source
3 optical sheet
4, 31, 36 underlayer light diffusion sheet
5 first prism sheet
6 second prism sheet
7 upper-layer light diffusion sheet
8 reflection sheet
11 substrate layer
12 light diffusion layer
13, 32 back layer
14 beads
15 binder
16, 33, 37 diffraction grating pattern
17 recessed portion
18 raised portion
21 production device
22, 23 press roller
34, 44, 54, 64, 74 protruding portion
101 backlight unit
102 LED light source
103 light-guiding sheet
104 optical sheet
105 light diffusion sheet
106 prism sheet
114 under-layer light diffusion sheet
X resin film

What is claimed is:
1. A light diffusion sheet for use in a liquid crystal display device, wherein
the light diffusion sheet comprises a substrate layer, a light diffusion layer overlaid on a light emission face side of the substrate layer, and back layer overlaid on a light incidence face side of the substrate layer, and
the light diffusion sheet further comprises on a back, light incidence face of the back layer, a multi-streak diffraction grating pattern that is oriented in a specific direction in a plane of the light diffusion sheet and is configured to diffuse rays of light in a width direction of the multi-streak diffraction grating pattern, the light diffusion sheet thereby being configured to condense rays of light in the specific direction and to diffuse rays of light in a direction perpendicular to the specific direction.

2. The light diffusion sheet according to claim 1, wherein the multi-streak diffraction gating pattern comprises scratches or hairline stripes extending in the specific direction.

3. The light diffusion sheet according to claim 1, wherein the light diffusion layer comprises beads and a binder for the beads.

4. The light diffusion sheet according to claim 1, wherein a haze value of the light diffusion sheet is no less than 60% and no greater than 95%.

5. A backlight unit for a liquid crystal display device comprising:
a light guide film configured to guide rays of light incident on an end face of the light guide film toward a front face side of the light guide film;
at least one LED light source disposed along the end face of the light guide film;
the light diffusion sheet according to claim 1 disposed on the front face side of the light guide film; and
a prism sheet disposed on a front face side of the light diffusion sheet,
wherein the specific direction in the light diffusion sheet is parallel to a direction of rays of light emitted by the at least one LED light source and is perpendicular to a direction of prism rows of the prism sheet.

* * * * *